United States Patent Office 2,919,759
Patented Jan. 5, 1960

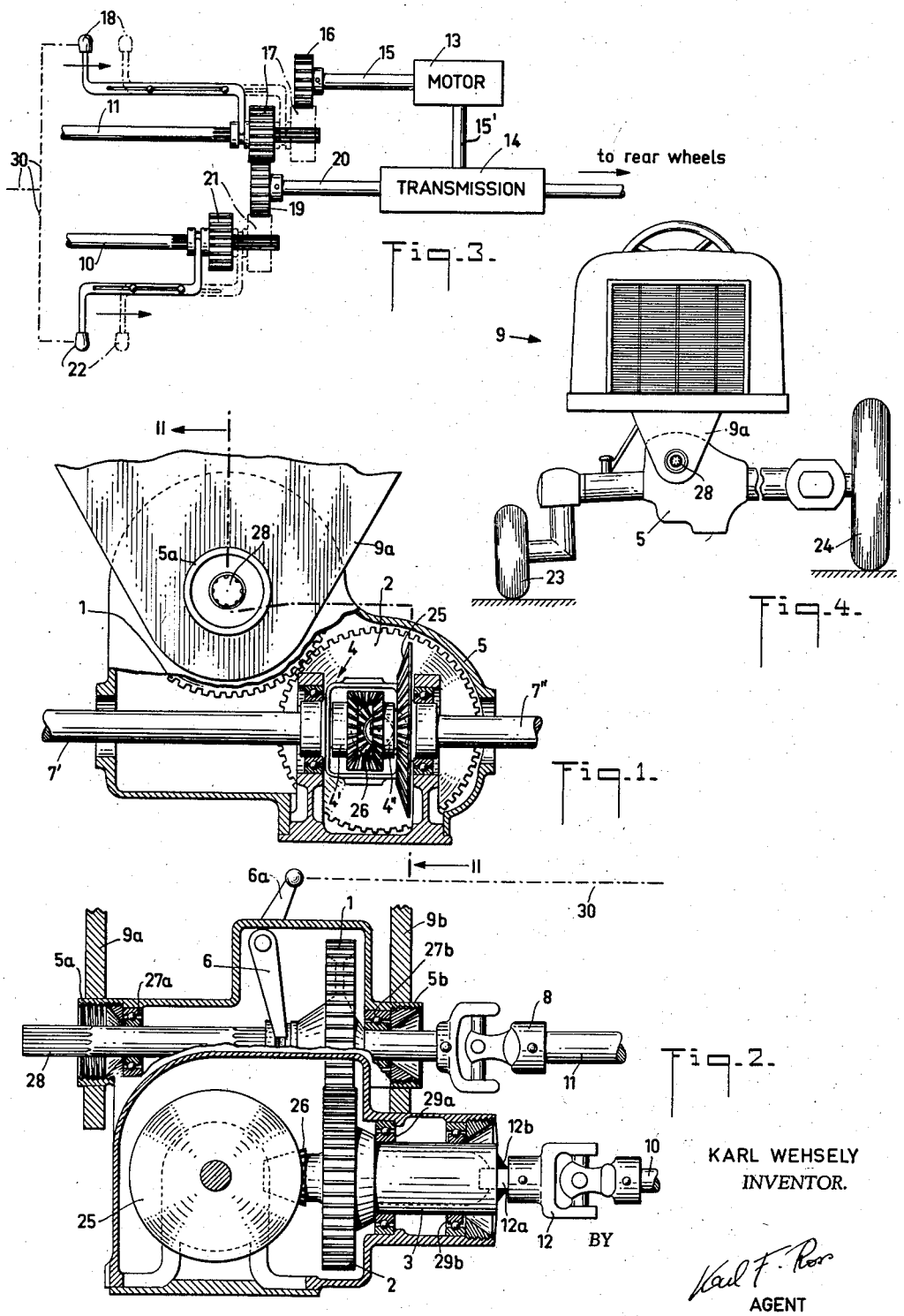

2,919,759

FRONT-WHEEL DRIVE FOR TRACTORS

Karl Wehsely, Leipzig, Germany, assignor to Institut für Landmaschinen und Traktorenbau, Leipzig, Germany, a corporation of Germany Application April 23, 1957, Serial No. 654,545

Claims priority, application Germany September 13, 1956

6 Claims. (Cl. 180—53)

The present invention relates to farm and road tractors having a forward drive shaft adapted to serve as a power source for an agricultural implement or other load when set in motion by the motor of the tractor.

An object of this invention is to provide means for coupling such shaft with the front-wheel axles of the tractor, by way of a differential gearing, in such manner as to transmit power to these axles at the same time that rotation is imparted to the drive shaft from the transmission of the tractor.

Another object of this invention is to provide means for coupling the drive or power-takeoff shaft with the aforementioned differential gearing in such manner that there will be effective transmission of power to the front wheels even though their axles are swingably mounted.

A further object of this invention is to enable the coupling between the drive shaft and the differential to be rendered ineffective when it is desired to have the drive shaft rotate with the front wheels idling, e.g. under condition calling for direct coupling of the shaft to the motor at a speed independent of the movement of the vehicle, and for separately driving this differential through the transmission whenever four-wheel drive of the tractor becomes necessary along with rotation of the load at steady speed.

According to a feature of the invention there is provided a housing pivotally mounted on the tractor body, the pivot of this housing coinciding with the forward drive shaft; a differential gearing within this housing having an input shaft parallel to the said drive shaft, this gearing having a pair of planet wheels whose axes are transverse to the two shafts and which are respectively secured to the two front-wheel axles projecting from the housing; and mechanism for selectively coupling the two shafts together for entrainment of the input shaft by the drive shaft, this mechanism preferably comprising a spur gear axially shiftable on the drive shaft for movement into and out of engament with a co-operating spur gear on the input shaft.

The above and other objects and features of the invention will be more fully apparent from the following detailed description of a preferred embodiment, reference being had to the accompanying drawing in which:

Fig. 1 is a front elevational view, partly in section, of the swingable gear housing and associated parts forming part of a front-end assembly according to the invention;

Fig. 2 is a sectional view taken on the line II—II of Fig. 1;

Fig. 3 is a somewhat diagrammatic view of a coupling arrangement for selectively applying motor power either directly or through a transmission to the drive shaft of the assembly of Fig. 1; and Fig. 4 is a fragmentary front elevational view of a tractor incorporating the system shown in Figs. 1–3.

Rigid with the body 9 of a tractor are a pair of standards 9a, 9b in which there are journaled the trunnions 5a, 5b of a swingable, asymmetrical housing 5. Projecting from this housing are the axles 7', 7" of a pair of front wheels 23 of which one is shown in Fig. 4. The axles 7', 7" carry the planet gears 4', 4" of an eccentrically positioned differential gearing 4 whose revolving frame is fixed to a bevel gear 25. The latter meshes with a beveled pinion 26 mounted on the input shaft 3 of the differential 4, the shaft 3 being coupled via a universal joint 12 with a transmission shaft 10 leading toward the rear of the tractor. Differential 4, axles 7', 7" and shaft 3 are bodily swingable, along with housing 5, about the axis of housing trunnions 5a, 5b which is parallel to the shaft 3 and lies in the plane of symmetry of the tractor. Shaft 3 is rotatably journaled in housing 5 by means of ball bearings 29a, 29b and is recessed to receive a tongue 12a projecting from joint 12, which is surrounded by a rubber bumper 12b.

A drive shaft 28 is rotatably supported, by means of ball bearings 27a, 27b, within the trunnions 5a, 5b so that its axis coincides with the pivotal axis of housing 5. The shaft 28, whose projecting forward extremity is splined for ready coupling to a suitable load not shown, is linked via a universal joint 8 with a power shaft 11 extending generally parallel to shaft 10. A splined intermediate portion of shaft 28 carries a spur gear 1 which is axially shiftable thereon by means of a lever 6, the latter being rigid with a control arm 6a located outside the housing 5. In its operative position illustrated in Figs. 1 and 2, gear 1 meshes with a spur gear 2 fixedly carried on the input shaft 3 of differential 4. It will be apparent that gear 2 can roll on the periphery of gear 1 when the housing 5 swings about its pivotal axis.

A motor 13, illustrated schematically in Fig. 3, drives the rear wheels 24 (only one shown in Fig. 4) of the tractor by way of a transmission 14 containing the usual clutch and speed-changing mechanism. The motor 13 has a first shaft 15 carrying a spur gear 16 and a second shaft 15' driving the transmission 14, the two shafts having been shown to extend at right angles to each other. The motor 13 may, of course, include bevel gears or any other conventional coupling arrangement for connecting a rotating driving element to two orthogonally related shafts. A spur gear 17 is axially displaceable on shaft 11, by means of a lever 18, to mesh either with the spur gear 16, fixed to the motor shaft 15, or with a spur gear 19, fixed to a shaft 20 extending forwardly from transmission 14. Shaft 10, similarly, carries a spur gear 21 which is axially displaceable thereon, by means of a lever 22, to be selectively engaged with or disengaged from the spur gear 19 on shaft 20. It will be understood that the mounting of shaft 10 and its linkage to shaft 3 should be sufficiently flexible to allow for limited relative displacement between shaft 20 and housing 5 as the latter swings about its axis.

As will be readily apparent from the preceding description, operation of the levers 6, 18 and 22 enables drive shaft 28 to be coupled directly with motor 13, via gears 16 and 17, at a time when differential 4 is decoupled from shaft 28 at the gears 1 and 2. It also enables shaft 28 to be driven from transmission 14, by way of gears 17 and 19, and to transmit its rotation to the front-wheel axles 7', 7" by way of gears 1, 2 and differential 4. It finally enables these axles to be driven independently of shafts 11, 28 through gears 19, 21. It will also be understood that, if desired, levers 6 and 18 may be ganged for simultaneous operation in such manner that gears 1 and 2 will be out of mesh whenever gears 16 and 17 or gears 19 and 21 are in engagement with each other, and that levers 18 and 22 may be similarly interconnected to insure the engagement of gear 19 alternatively with gear 17 or with gear 21, as indicated by dot-dash lines 30 in Figs. 2 and 3.

The invention is, of course, not limited to the specific embodiment described and illustrated but may be modified in various details without departing from the spirit and scope of the appended claims. Thus, for example, it should be evident that the axles 7', 7" could also pass above drive shaft 28 rather than underneath it as shown.

What is claimed is:

1. In a tractor, in combination, a motor, transmission means connected to said motor, rear wheels adapted to be driven from said motor by way of said transmission means, a differential gearing at the front end of the tractor having an input shaft and a pair of output shafts, a pair of front wheels respectively connected with said output shafts, a drive shaft extending longitudinally of the tractor and having a forward end adapted to be coupled to a load, control means for selectively coupling said drive shaft with said input shaft, and coupling means for rotating said drive shaft by selectively connecting the latter to said motor either directly or by way of said transmission means.

2. The combination according to claim 1, wherein said coupling means and said control means are interconnected for decoupling said drive shaft from said input shaft upon said drive shaft being directly connected to said motor.

3. The combination according to claim 1, further comprising drive means selectively operable to apply power from said transmission means to either said drive shaft or said input shaft.

4. The combination according to claim 3, wherein said coupling means, said control means and said drive means are interconnected for decoupling said drive shaft from said input shaft and connecting said input shaft to the output of said transmission means upon said drive shaft being directly connected to said motor.

5. The combination according to claim 4, comprising a housing swingable about said drive shaft, said differential gearing being mounted in said housing.

6. The combination according to claim 5, wherein said control means comprises a pair of spur gears on said drive shaft and on said input shaft, respectively, and mechanism for shifting said spur gears into and out of mutual engagement.

References Cited in the file of this patent

UNITED STATES PATENTS

| | | |
|---|---|---|
| 1,447,073 | Gore | Feb. 27, 1923 |
| 2,245,078 | Padgett | June 10, 1941 |

FOREIGN PATENTS

| | | |
|---|---|---|
| 133,378 | Australia | July 1, 1949 |